United States Patent
Roddy et al.

(10) Patent No.: US 6,624,949 B2
(45) Date of Patent: Sep. 23, 2003

(54) PRINTING APPARATUS FOR PHOTOSENSITIVE MEDIA USING DICHROIC PRISM IN ILLUMINATION PATH

(75) Inventors: James E. Roddy, Rochester, NY (US); Robert J. Zolla, Rochester, NY (US); Richard J. Federico, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/067,929

(22) Filed: Feb. 6, 2002

(65) Prior Publication Data

US 2003/0147144 A1 Aug. 7, 2003

(51) Int. Cl.[7] .......................... G02B 27/14; G02B 27/28
(52) U.S. Cl. .................... 359/634; 359/487; 359/495
(58) Field of Search .................... 359/634, 219, 359/291, 247, 298; 358/471, 501; 353/34, 37

(56) References Cited

U.S. PATENT DOCUMENTS

| | | | |
|---|---|---|---|
| 5,433,859 A | 7/1995 | Degen | 210/651 |
| 5,543,286 A * | 8/1996 | Ueno et al. | 430/353 |
| 5,605,390 A | 2/1997 | Brice et al. | 353/119 |
| 5,684,620 A * | 11/1997 | Schoon | 430/353 |
| 5,795,047 A | 8/1998 | Sannohe et al. | 353/81 |
| 5,808,410 A * | 9/1998 | Pinker et al. | 430/353 |
| 5,816,675 A | 10/1998 | Brice et al. | 353/31 |
| 5,893,662 A * | 4/1999 | Ito | 399/107 |
| 5,917,560 A | 6/1999 | Neumann | 349/8 |
| 5,978,008 A * | 11/1999 | Crawford et al. | 347/230 |
| 5,982,407 A | 11/1999 | Enomoto et al. | 347/239 |
| 6,019,474 A | 2/2000 | Doany et al. | 353/37 |
| 6,053,615 A | 4/2000 | Peterson et al. | 353/70 |
| 6,108,132 A * | 8/2000 | Itoh | 359/487 |
| 6,215,547 B1 | 4/2001 | Ramanujan et al. | 355/67 |
| 6,220,713 B1 | 4/2001 | Tadic-Galeb et al. | 353/77 |
| 6,229,651 B1 | 5/2001 | Edlinger | 359/583 |
| 6,238,051 B1 | 5/2001 | Huang | 353/81 |
| 6,254,237 B1 | 7/2001 | Booth | 353/31 |
| 6,262,851 B1 | 7/2001 | Marshall | 359/634 |
| 6,278,474 B1 | 8/2001 | Wada et al. | 347/241 |
| 6,324,373 B1 * | 11/2001 | Park | 399/296 |
| 6,348,996 B1 * | 2/2002 | Itoh | 359/487 |
| 6,348,997 B1 * | 2/2002 | Itoh | 359/487 |
| 6,442,124 B1 * | 8/2002 | Chung et al. | 369/112.07 |
| 2002/0118375 A1 * | 8/2002 | Ramanujan et al. | 358/1.2 |
| 2003/0011751 A1 * | 1/2003 | Sakata et al. | 353/30 |

* cited by examiner

*Primary Examiner*—Hung Xuan Dang
*Assistant Examiner*—Omar Hindi
(74) *Attorney, Agent, or Firm*—Nelson Adrian Blish (57) ABSTRACT

A writing apparatus (10) for forming images from digital data onto color motion picture film or other photosensitive medium (32), the apparatus employing a single spatial light modulator (30) and having an illumination system (14) comprising a dichroic prism (26) and a plurality of light sources (20). The dichroic prism (26) directs light from each light source (20) onto a common output axis, thereby providing an incident light beam for modulation by the spatial light modulator (30). The apparatus allows high-speed imaging optimized for photosensitive media (32). Additional sensor (12) and logic components allow writing apparatus (10) to adapt to different types of photosensitive media (32) without requiring any retooling or manual adjustment.

33 Claims, 4 Drawing Sheets

PRINTING APPARATUS FOR PHOTOSENSITIVE MEDIA USING DICHROIC PRISM IN ILLUMINATION PATH

FIELD OF THE INVENTION

This invention generally relates to apparatus for writing digitally encoded color images onto photosensitive media and more particularly relates to an apparatus for writing color images onto motion picture film from digital data using a single spatial light modulator with a plurality of light sources.

BACKGROUND OF THE INVENTION

In conventional motion picture film preparation, a master negative film is developed and prepared as an intermediate from which copies can be mass-produced as print films. One example of a motion picture printer using conventional optical methods for producing print films is the Model 6131 Series Printer manufactured by BHP Incorporated, Chicago, Ill. Using such conventional methods and optical equipment, projection-quality print films for distribution can be produced economically, at high speed.

With the advent of digital motion picture imaging, conventional optical methods can still be used for print film preparation. That is, a master negative film can be prepared using digital imaging equipment. This same master negative film then serves as an intermediate for print film production, following the conventional sequence used for film production using optical equipment. However, it can be appreciated that there are benefits to film production methods that offer increased speed, lowered cost, and increased versatility over earlier methods. As one example, conventional methods don't allow imaging directly to print film economically. Using conventional equipment, an intermediate film is still required, with an accompanying loss of some measure of image quality in transfer between the intermediate negative film and the final print film.

Those knowledgeable in the film production arts will realize that relatively slow writing speeds are a disadvantage for digital film production. Conventional digitally-based motion picture film imaging systems, using CRT writers or using lasers in conjunction with a spinning polygon, yield writing output speeds measured in multiple seconds per frame. However, high-speed film duplication using older optical exposure methods achieves speeds measured in multiple frames per second. Thus, in order to provide a competitive alternative to optical film production methods, digital film production methods must improve upon current printing times.

Light Modulators for Printing

For motion picture film and other photosensitive media in general, spatial light modulators show considerable promise as image forming components. Originally developed for digital projection equipment, spatial light modulators are being more widely used for imaging onto film and other photosensitive media. Spatial light modulators used for this purpose include liquid crystal devices (LCDs) from Victor Company of Japan (JVC), Yokohama, Kanagawa, Japan, and digital micromirror devices (DMDs) from Texas Instruments, Dallas, Tex. A spatial light modulator can be considered essentially as a two-dimensional array of light-valve elements, each element corresponding to an image pixel. Each array element is separately addressable and digitally controlled to modulate light. An LCD, for example, modulates light intensity for a pixel by modulating the polarization state of light from the array location corresponding to that pixel. For operation, the LCD must be provided with plane polarized light.

Both LCD and DMD arrays have advantages over other types of image-forming devices. Because LCD and DMD arrays can image a complete frame at a time, there is minimal mechanical complexity and thus, lower cost. Thus, LCDs and DMDs enjoy complexity and cost advantages, particularly in contrast to writing systems using lasers with spinning polygons.

Though not as widely used, other types of spatial light modulators used for photosensitive media include gated light valves such as lead lanthanum zirconate titanate (PLZT) light valves. The gated light valve is essentially an array of light-transmitting elements arranged in linear fashion to provide a 1×m pixel array, where the width of the array, m, is typically in the range of a few thousand pixels. One example of a gated light valve is a Micro Light Valve Array (MLVA) used in the Noritsu model QSS-2711 Digital Lab System, manufactured by Noritsu Koki Co., located in Wakayama, Japan. The same basic imaging principle used with spatial light modulators applies, whereby individual elements in the array vary in the intensity of light emitted. However, using a linear array provides only one line of the two-dimensional image at a time, and therefore requires movement of the photosensitive media relative to the printhead in order to expose a complete frame.

Alternative Light Sources

There are a number of alternative light sources for use with a spatial light modulator in an apparatus that images onto a photosensitive medium, including the following:

(a) tungsten or halogen lamp. These sources, although used in many types of film development and processing systems, are not advantageous for high-speed film printing using spatial light modulators. Substantial filtering and polarization optics are typically required to adapt lamp sources to spatial light modulators, with concomitant loss of brightness. Shuttering components would be necessary for color printing using multiple sources. Heat management would also be necessary for tungsten or halogen sources.

(b) LED. These light sources are low cost and have favorable response speeds when compared against other light sources that must be shuttered. However, single LEDs do not generally provide sufficient brightness for high-speed imaging. Arrays comprising multiple LEDs are one possible solution; however, conventional solutions using LED arrays face aperture size and cone angle constraints, which force tradeoffs between cost, complexity, and brightness. These disadvantages have, therefore, limited the use of LEDs as light sources for high-speed production of motion picture films.

(c) laser. The laser has advantages including high brightness and narrow bandwidth. As a further advantage, laser output is inherently polarized, not requiring polarization conditioning by lossy components in the optical path. However, lasers are higher in cost, particularly in some wavelengths.

Overall, LEDs and lasers are more durable than lamps and provide a favorable solution for imaging systems needing light at specific wavelengths and having high brightness levels.

Illumination Optics Path Considerations for Color Printing

Color motion picture printing uses sequenced exposures at discrete red, green, and blue (RGB) wavelengths. As a general rule for throughput efficiency, printing speed is primarily a factor of the achievable brightness of the light source. The preferred approach for illumination optics, as disclosed in U.S. Pat. No. 6,215,547 (Ramanujan et al.) teaches the use of a single illumination optics path to one spatial light modulator for successive modulation of red, green, and blue light. Using a time-sequenced illumination scheme, the red, green, and blue light sources are sequentially modulated by the spatial light modulator and focused onto a photosensitive medium.

U.S. Pat. No. 6,215,547 discloses a number of possible alternative light sources, including a lamp provided with a rotating filter wheel or multiple LEDs arrayed in different parts of a circular aperture. A notable advantage of the arrangement disclosed in U.S. Pat. No. 6,215,547 is that the same illumination and imaging optics path is used for light of each color. This eliminates the need for registration of separate color path components and allows a minimum of components to be employed for full-color imaging onto the photosensitive medium. However, the arrangement disclosed in U.S. Pat. No. 6,215,547 presents some obstacles. Aperture size and optical cone angle constraints can limit the number of LED or other light sources provided, thus limiting the brightness achieved. Compromises that can be made include deploying, within the limited space available, a different number of LEDs or other light sources for each wavelength according to sensitometric response characteristics of the target media. Solutions requiring motor movement, such as the rotating filter wheel, may introduce unwanted mechanical complexity and vibration effects. Timing considerations are complicated by the need to avoid using transitional zones in a filter wheel using multiple color filters. In spite of such problems, it can be appreciated that there would be substantial benefits to an illumination scheme that utilizes a single optics path with a single spatial light modulator.

An alternative approach for illumination optics would be to employ a separate optical path for each color. This approach has been widely used in digital color projection. For example, U.S. Pat. No. 6,053,615 (Peterson et al.), U.S. Pat. No. 6,220,713 (Tadic-Galeb et al.) and U.S. Pat. No. 6,262,851 (Marshall) all disclose projectors that use separate red, green, and blue light paths, each light path using its own separate spatial light modulator. Certainly, this approach increases the output brightness levels of an imaging system using spatial light modulator technology. However, the added cost and complexity when using separate spatial light modulators can be a significant disadvantage.

It is instructive to note that the requirements for digital color printing and projection can be very different in some ways. Projectors are optimized to provide maximum luminous flux to a screen, with secondary emphasis placed on characteristics important in printing, such as contrast and resolution. Optical systems for projector and display applications are designed for the response of the human eye, which, when viewing a display, is relatively insensitive to image artifacts and aberrations and to image non-uniformity, since the displayed image is continually refreshed and is viewed from a distance. However, when viewing printed output from a high-resolution printing system, the human eye is not nearly as "forgiving" to artifacts and aberrations and to non-uniformity, since irregularities in optical response are more readily visible and objectionable on printed output. For this reason, there can be considerable complexity in optical systems for providing a uniform exposure energy for printing. When imaging onto print film for digital cinema, an added factor relates to the characteristic gamma of the print film. Due to film gamma, artifacts of the spatial light modulator become more pronounced when imaged onto print film, thereby accentuating an image quality problem originating at the spatial light modulator.

Also significant are differences in resolution requirements. Adapted for the human eye, projection and display systems are optimized for viewing at typical resolutions such as 72 dpi or less, for example. Photographic printing apparatus, on the other hand, must achieve much higher resolution, depending on the media type. For example, apparatus designed for micrographics applications are expected to provide 8,000 dpi for some systems. Thus, while LCD spatial light modulators can be used in for both projection display and high-resolution printing, the requirements on supporting optics can vary significantly.

In light of these significant differences between color projection and color printing using spatial light modulators, then, it can be readily appreciated that technical solutions that may be well-suited to digital projection apparatus using spatial light modulators may not be appropriate to digital printing apparatus using a spatial light modulator.

One technical solution that has been broadly applied for digital projection apparatus, but has not been widely used with digital printing apparatus, is the use of dichroic optical components. Well known in the optical design arts, dichroic components provide treated surfaces that reflect light over some range of wavelengths and transmit light of other wavelengths. Of particular interest are dichroic prisms, such as those manufactured by Optec S. R. L., Italy. Dichroic prisms provide combinations of dichroic surfaces between prisms, cemented together in arrangements such as in the familiar X-cube or X-prism, Philips prism, and related devices. Different types of dichroic prisms are described, for example, in U.S. Pat. No. 6,229,651 (Edlinger), U.S. Pat. No. 6,238,051 (Huang), and U.S. Pat. No. 6,019,474 (Doany et al.)

In digital projection, dichroic separators are employed in the illumination path, to separate white light into red, green, and blue light components for modulation. U.S. Patent No. 6,053,615 (Peterson et al.), U.S. Pat. No. 6,220,713 (Tadic-Galeb et al.), and U.S. Pat. No. 6,254,237 (Booth) are just a few examples of projector designs using this approach. Dichroic combiners are then used at a later point in the optical path, after modulation at the spatial light modulators. Dichroic combiners, typically X-cubes or X-prisms and Philips prisms, have been widely used in digital projectors for combining the optical paths of modulated light, incident from a number of different axes, into a single, common axis for projection. As just a few examples, U.S. Pat. Nos. 5,453,859 and 5,795,047 (both to Sannohe et al.) and U.S. Pat. No. 6,262,851 (Marshall) disclose use of an X-cube or similar dichroic combiner for combining modulated light in the output path for a digital projection apparatus. U.S. Pat. Nos. 5,605,390 and 5,816,675 (both to Brice et al.) disclose a digital projection apparatus that uses an X-cube as a dichroic splitter in the illumination path and a similar X-cube as a dichroic combiner for modulated light in a compact projector. U.S. Pat. No. 5,917,560 (Neumann) discloses use of a single X-cube as both dichroic separator and dichroic combiner for a projection apparatus.

U.S. Pat. No. 6,278,474 (Wada et al.) discloses a complex printing apparatus that uses a dichroic prism in the path of modulated light. In the embodiment disclosed in U.S. Pat. No. 6,278,474, the dichroic prism provides a component for redirecting modulated light from any of three linear printheads onto a moving medium. This solution may work well when using linear light modulation, which provides a single line of pixels at a time. However, because the spatial light modulator provides a full image frame at one time, this approach becomes more difficult to implement with a spatial light modulator. One notable weakness of X-cube devices in the imaging path, for example, is due to the intersection line of crossed dichroic surfaces at the center of the device. Dependent, in part, on the placement of the X-cube in the imaging path, image aberrations caused by this line of intersection can be visible in a printed image. Moreover, due to space considerations it is unclear how the solution of U.S. Pat. No. 6,278,474 could be implemented in any simple and inexpensive way when using a spatial light modulator of the reflective type.

U.S. Pat, No. 5,982,407 (Enomoto et al.) discloses a printing apparatus that uses dichroic mirrors in its illumination light path for DMD spatial light modulators. In the embodiment disclosed in U.S. Pat. No. 5,982,407, dichroic mirrors are deployed to direct light from red, green, and blue light sources onto the surface of a DMD. This arrangement provides relatively good brightness levels and minimizes the complexity of light conditioning optics in the illumination path. However, there are a number of disadvantages when using a sequence of dichroic mirrors as disclosed in U.S. Pat. No. 5,982,407. Space requirements are one key disadvantage with the use of multiple dichroic mirrors. These mirrors must be staggered and spaced correctly with respect to one another and to the individual light sources, making it difficult to design a printing apparatus in a compact package. Moreover, each individual dichroic mirror must be correctly aligned relative to its light source and to the illumination optics path for proper performance. Another significant disadvantage when using multiple dichroic mirrors as shown in U.S. Pat. No. 5,982,407 relates to the relative cone angles of incident light. The most advantageous arrangement would provide incident light from all colored light sources at the same cone angle. With the layout shown for U.S. Pat. No. 5,982,407, however, the effective cone angle for light incident on the spatial light modulator can differ substantially from one colored light source to the next. It would be cumbersome to provide identical cone angles for incident light of each color when using the arrangement of U.S. Pat. No. 5,982,407, placing dimensional constraints on component layout or adding the expense of additional optical components. Without restrictive design constraints or added cost, a different percentage of light from each light source is effectively available at the spatial light modulator when using dichroic mirrors. Any optical components for obtaining a uniformly bright field, such as lenslet arrays, integrating bars, or related devices, would then necessarily be different within each colored light path; otherwise, the compromises that would be needed could easily degrade the overall brightness of the illumination system. Moreover, it would be difficult to provide illumination having the same height-width aspect ratio as the spatial light modulator when using the arrangement disclosed in U.S. Pat. No. 5,982,407. Obtaining color balance would be further complicated, since different light sources would not be uniformly bright due, in large part, to cone angle differences.

As was noted above, there are advantages in maximizing brightness and minimizing cost and complexity in the illumination optics subsystem of a digital color printing apparatus. With this in mind, it can readily be appreciated that there are advantages to an illumination system that provides source light having a large cone angle that is substantially the same for each of the component colors. There are further advantages for printing apparatus design in making the illumination optics subsystem as compact as possible.

In conventional practice, printing apparatus are often designed to be compatible with one type of photosensitive medium. While some ability to adapt to different media types and conditions is inherent in the ability to modulate at the spatial light modulator itself, it can be appreciated that there would be advantages in designing an illumination system that has added adaptability. For example, different types of photographic film or paper process optimally under different brightness conditions. There would be advantages, therefore, in providing a printing apparatus that is adaptable to as broad a range of media as possible.

In summary, it can be seen that there is room for improvement in maximizing brightness, in simplifying the time sequencing, in streamlining the component arrangement, and in providing solutions which allow compact component packaging for the illumination optics path of a digital color printing apparatus using a spatial light modulator.

SUMMARY OF THE INVENTION

It is an object of the present invention to provide a digital color writing apparatus using a spatial light modulator and having an illumination optics path that provides improved brightness and provides other advantages over conventional systems.

Briefly, according to one aspect of the present invention a writing apparatus for forming an image from digital data onto a photosensitive medium comprises:

(a) a spatial light modulator comprising an array of pixel sites, each pixel site modulating an incident light beam in order to form an array of image pixels according to the digital data; and (b) an illumination system comprising a dichroic prism for combining input light from a plurality of light sources onto a common output axis to provide the incident light beam.

It is a feature of the present invention that it employs a dichroic combiner in a novel arrangement within the illumination system of the digital color writing apparatus.

It is an advantage of the present invention that it provides an apparatus capable of achieving high print speeds that can equal or exceed those available with conventional laser and polygon-based equipment. Moreover, the apparatus of the present invention achieves high throughput speeds without the complexity and cost of rotating reflective components and their support timing structures.

It is a further advantage of the present invention that it allows the use of colored light sources having high brightness, while providing a single optical path for directing and conditioning an incident light beam from such sources for modulation. With respect to the optical path, the present invention relaxes limitations on the illumination area where arrays of light sources are employed. In effect, for each color, an array of light sources can fill the full aperture and illumination cone angle available. Since it positions each light source at the same optical distance from uniformizing optics and modulation components, the present invention also facilitates providing, for each color illumination at the same height-width aspect ratio as the spatial light modulator.

It is a further advantage of the present invention that its optical arrangement provides each component light source at substantially the same cone angle. This simplifies the design of optics used to provide a uniform light field for each color source in the illumination path.

It is a further advantage of the present invention that it provides a compact arrangement of light sources that can be clustered in close proximity to the dichroic prism.

It is a further advantage of the present invention that it provides an arrangement that allows straightforward alignment of colored light from multiple light sources onto a single illumination path.

It is a further advantage of the present invention that it allows the sequencing of colored light to be controlled directly at the light source, thereby taking advantage of fast switching times of LED devices and eliminating the need for rotating filters, shutters, or other optical or mechanical devices used for providing sequential color with conventional approaches. Using the method of the present invention, it is straightforward to adapt exposure intensity and duration to the specific response characteristics of a photosensitive medium.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
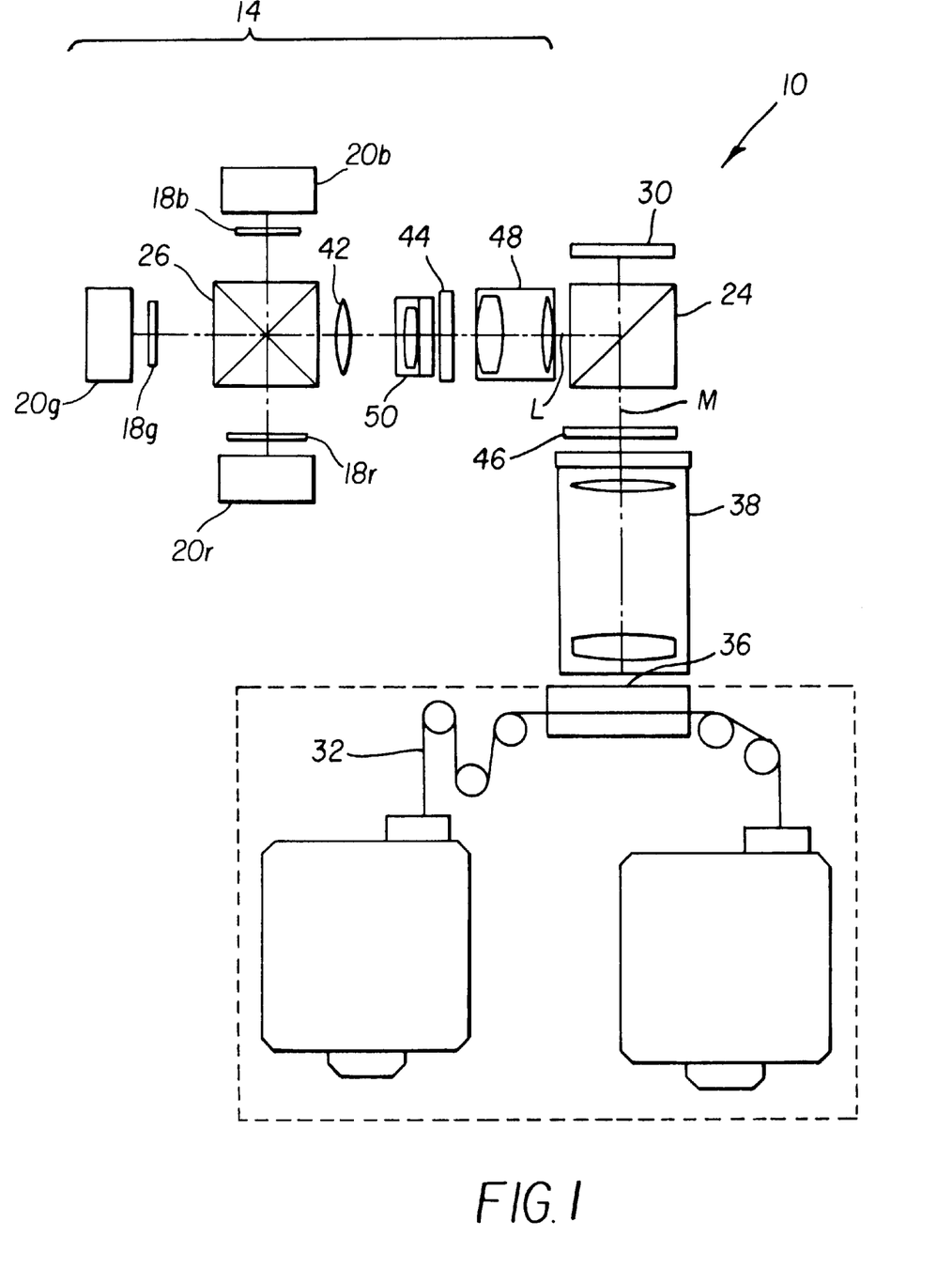
FIG. 1 is a schematic block diagram showing the major optical components in a digital printing apparatus using a spatial light modulator and the illumination system of the present invention.

Referring to FIG. 1, there are shown, in block diagram form, the basic optical components of a printing apparatus 10 of the present invention. An illumination system 14 provides an incident light beam L through a polarizing beamsplitter 24 to a spatial light modulator 30. Polarizing beamsplitter 24 reflects one polarized component of incident light beam L toward spatial light modulator 30. Spatial light modulator 30 modulates individual pixels of the incident light and reflects a modulated light beam M through polarizing beamsplitter 24 to a print lens 38, which focuses modulated light beam M for imaging at image plane 36 onto photosensitive medium 32. For the basic configuration of FIG. 1, spatial light modulator 30 is a reflective LCD.

A re-arrangement of components from that shown in FIG. 1 would apply for modulation using a transmissive LCD as spatial light modulator 30. For such an alternative configuration, a straight-line optical system could be provided, eliminating polarizing beamsplitter 24 and the 90 degree deflection of the light path. Following conventional techniques well known in the optical arts, transmissive LCD spatial light modulator 30 would then be inserted into the light path after illumination system 14, preceded by a polarizer for providing suitably polarized light and followed by an analyzer.

A slight re-arrangement of components from that shown in FIG. 1 would also apply when using a DMD as spatial light modulator 30. As is well known in the optical arts, the DMD would accept, from illumination system 14, incident light beam L at the proper angle. No polarization components would be required for a DMD-based printing apparatus 10.

In the preferred embodiment, illumination system 14 provides incident light beam L in a cyclical sequence of red, green, and blue color light. By alternating colors in this way, a single spatial light modulator 30 can be used for successive imaging using red, green, and blue wavelengths, such as is done for photographic film printing, for example. To provide incident light beam L, as one of a plurality of different colors, along a common axis A, illumination system 14 uses a dichroic prism 26. The X-cube or X-prism of a preferred embodiment, familiar to those skilled in the optical arts, is shown as dichroic prism 26 in FIG. 1.

Figure 2:
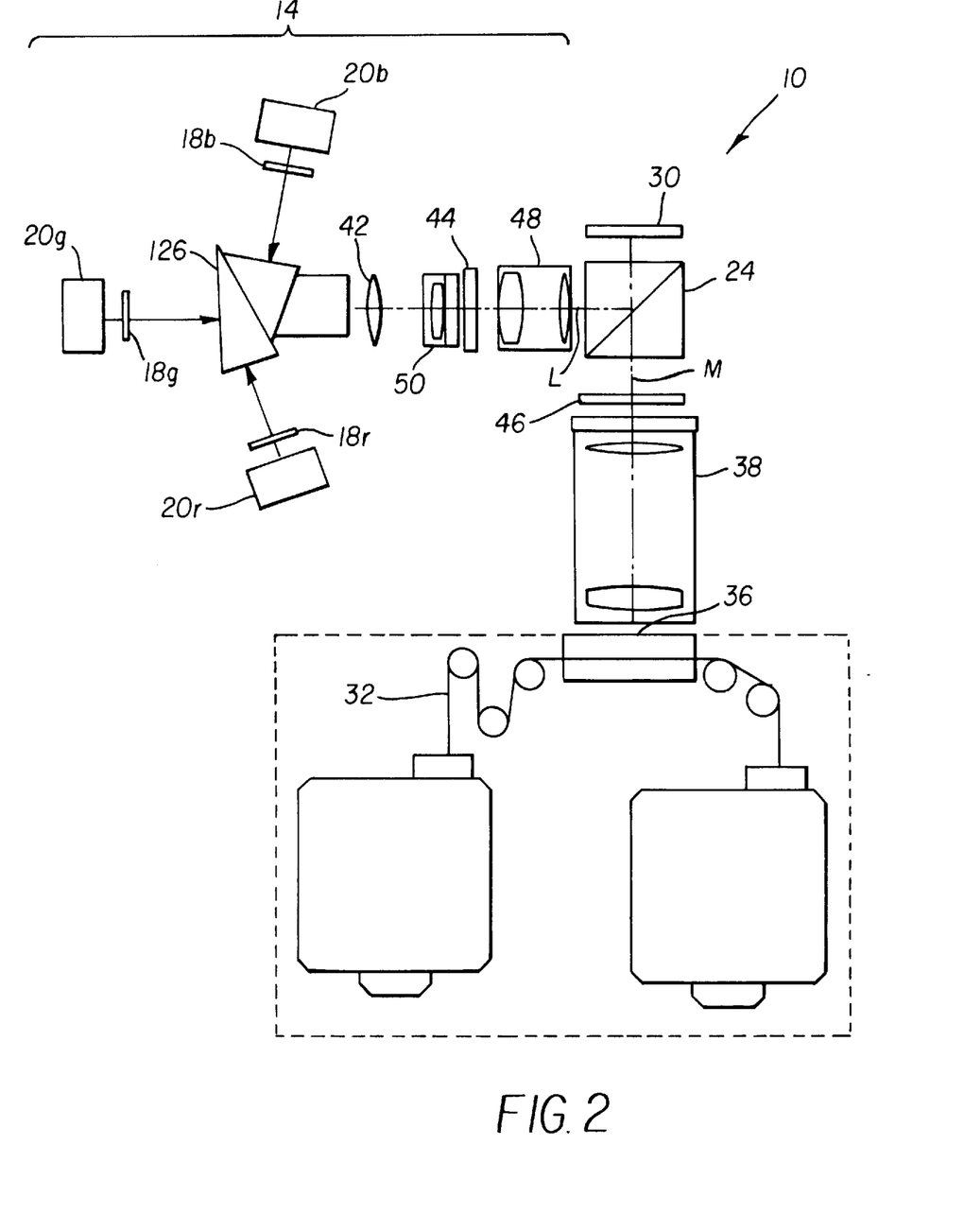
FIG. 2 is a schematic block diagram showing the major optical components in an alternate embodiment of the present invention.

FIG. 2 shows an alternate arrangement in which a Philips prism 126 is used as dichroic prism 26.

Referring to FIGS. 1 and 2, it should be noted that similar components are used for providing light for each color. Components for individual color paths are designated with an appended letter: "r" for red, "g" for green, "b" for blue. These appended letters are used in this specification only when necessary to be specific in discussion of a color path.

Returning to FIG. 1, a light source 20, possibly conditioned by an optional polarization filter 18, provides input source light to dichroic prism 26. Illumination from red light source 20r is reflected by a dichroic surface within dichroic prism 26 to emerge as output along optical axis A. Similarly, illumination from blue light source 20b is reflected from a dichroic surface within dichroic prism 26 to emerge as output along optical axis A. Illumination from green light source 20g is transmitted through dichroic prism 26, also output along optical axis A. Thus, the action of dichroic prism 26 combines each of light sources 20r, 20g, 20b to provide output light along optical axis A. It must be noted that the X-cube that serves as dichroic prism 26 exhibits sensitivity to the angle of incident light, giving best performance with light at normal or near-normal incidence. For this reason, flat LED arrays are preferred for light source 20, as shown in FIGS. 1 and 2. Optional red, green, and blue polarization filters 18r, 18g, and 18b condition the polarization of light from the corresponding light sources 20r, 20g, and 20b. Condensing lens 42 then optimizes capture of light from the LEDs.

Additional beam-shaping optics are provided to further condition this output light in order to provide incident light beam L for polarizing beamsplitter 24. Output light from dichroic prism 26 goes to a condenser lens 42 and to a field lens 50 which directs the illumination beam to a uniformizer 44, such as an optical tunnel, integrating bar, or lenslet array, that provides a uniform illumination field for incident light beam L. A condenser lens 48 then directs uniform incident light beam L to polarizing beamsplitter 24. For optimum optical efficiency and writing speed, it is preferable that light source 20 and the lenslet array or integrator bar of uniformizer 44 have substantially the same height-width aspect ratio as spatial light modulator 30.

The arrangement of FIGS. 1 and 2 allows printing apparatus 10 to provide exposure light having intense brightness levels with controlled duration. Using dichroic prism 26, each light source 20 provides illumination at the same cone angle, maximizing brightness and simplifying the design of uniformizer 44 and lenses 42 and 50.

Adapting to Type of Photosensitive Medium 32

Figure 3:
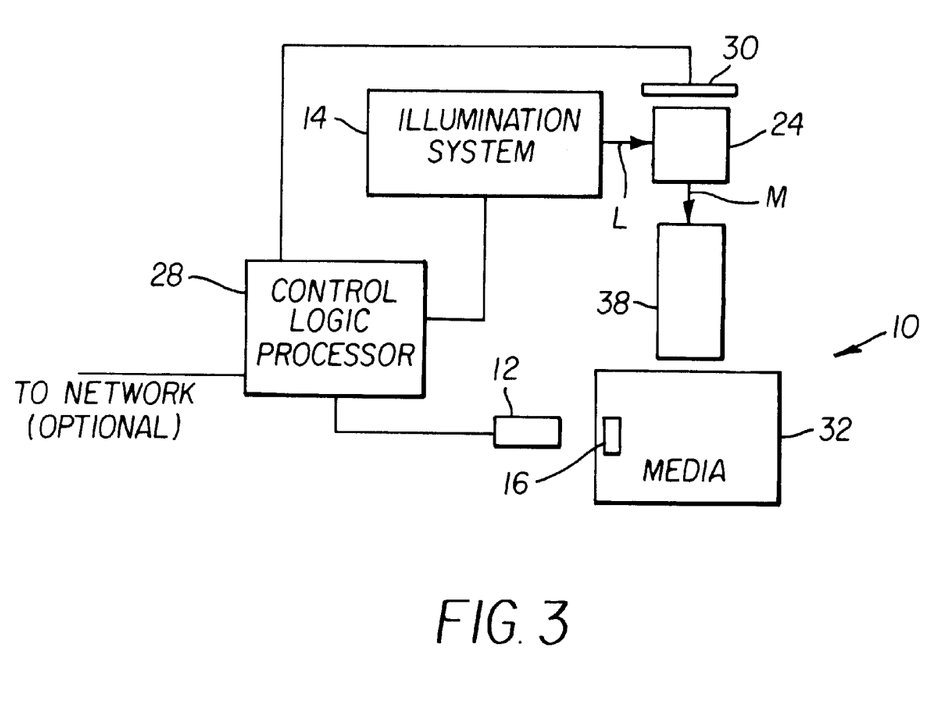
FIG. 3 is a schematic block diagram showing major components of a digital printing apparatus capable of adapting to a media type.

Referring to FIG. 3, there is shown an optional arrangement of major components for printing apparatus 10 that enable sensing and detection of the type of photosensitive medium 32 that has been loaded for imaging. A control logic processor 28, typically a dedicated microprocessor or other computer, controls illumination system 14 to adjust the brightness and duration of incident light beam L for each color. Since the exposure energy is proportional to brightness (or intensity) and duration, control of illumination system 14 allows control logic processor to adapt printing apparatus 10 to a number of compatible types of photosensitive media 32. An operator could provide commands to control logic processor to indicate the type of media 32. In the embodiment shown in FIG. 3, automatic detection is provided. A sensor 12 connects as input to control logic processor 28. Sensor 12 detects the presence of an indicator 16 that is coupled to photosensitive media 32. Optional sensor 12 can thus read encoded information from indicator 16, where this information concerns photosensitive medium 32. This information can be used by control logic processor 28 to change the behavior of illumination system 14 appropriately. By way of example, and not by way of limitation, Table 1 lists a representative number of possible sensors 12 and the corresponding indicator 16 provided with photosensitive medium 32.

TABLE 1

Encoding and Sensor Possibilities

| Where encoding of indicator 16 has the form: | Sensor 12 could be: |
|---|---|
| Barcode or other optical encoding | Barcode reader or other optical reader, such as built-in or hand-held scanner. |
| Transponder containing a memory that includes identifying data for the media, such as an RF transponder, "SAMPT" (Selective Addressable Multi-Page Transponder), part number "RI-TRP-IR2B" available from Texas Instruments, Incorporated. | Transceiver, such as an RF transceiver, for example, "Model S2000" ™ transceiver, available from Texas Instruments, Incorporated, located in Dallas, Texas, USA. |
| Magnetically encoded strip | Magnetic strip reader |
| Memory device, such as an I-button, manufactured by Dallas Semiconductor Corp., Dallas, Texas. | I-button reader |
| Mechanical configuration, connector, or attachment. | Electro-mechanical sensor stimulated or activated by mechanical configuration, connector, or attachment. |

As Table 1 suggests, there are numerous ways for sensing information about photosensitive media 32 that would allow printing apparatus 10 to adapt accordingly. Among possible alternatives, the indicator 16 encoding could be printed on or attached to photosensitive medium 32 packaging or could be provided from a network connection or manually entered by an operator. Using this option with the preferred embodiment, upon sensing media 32 type, control logic processor 28 would be capable of controlling multiple variables in the exposure process, such as light intensity and duration for illumination system 14 or voltage bias settings for spatial light modulator 30, for example.

Just a few examples of types of information that can be encoded using indicator 16 include:

Product identification;
Batch number;
Date of manufacture;
Data on sensitometric characteristics;
One or more encoded instructions for operation of printing apparatus 10;
Look-up tables or pointers to stored data;
URL or similar network address for obtaining preferred processing parameters from a networked site.

Where a URL or similar network address is provided, control logic processor 28 could be programmed for automatic access to the network site, using techniques familiar to those skilled in networking technology. This would allow control logic processor 28 to obtain the needed processing parameters or to download executable instructions for processing photosensitive medium 32.

Color-Sequential Operation

As synchronized by control logic processor 28 which provides image frames of successive color components in order, spatial light modulator 30 forms images in color-sequential fashion in printing apparatus 10 of the present invention. Thus, for example, spatial light modulator 30 forms the red component of an image frame when provided the data for the red component and illuminated by the red color source, then forms the green component when provided the data for the green component and illuminated by the green color source, and then forms the blue component when provided the data for the blue component and illuminated by the blue component source. This pattern repeats: red, green, and blue for each successive frame. For each separate component color, control logic processor 28 can configure spatial light modulator 30 with a different set of parameters, such as voltage bias level. In this way, spatial light modulator 30 can adjust its behavior for each component color.

In this color-sequential operation, the image data processed by control logic processor 28 can also be conditioned using a separate Look-Up Table (LUT) for each color. Thus, printing apparatus 10 is able to optimize color printing for each component color. Typically, component colors are R, G, and B, however, the method and apparatus of the present invention could be readily adapted to an alternate color sequence.

Light Source 20 Component Selection and Options

In a preferred embodiment, light source 20 is an LED array, fabricated by assembling multiple LEDs on a surface. A preferred embodiment uses LEDs such as Model No. NSPB500 and NSPG500 series blue and green devices available from Nichia America Corp., Mountville, Pa. or H3000L series red devices available from Stanley Electric Co., Ltd, Tokyo, Japan. Commercial LED arrays that could be used include types such as the Luxeon Star/O LXHL-NE98, available from LumiLeds Lighting, San Jose, Calif. LEDs have a number of advantages for providing imaging light, including high brightness, spectral purity, and fast switching times.

Alternative light sources include other LED types or lasers. While some types of lamps might be used, such devices would require additional filtering and shutter components, which can add cost and complexity as well as introducing undesirable heat and space requirements.

In the most straightforward embodiment, light sources 20r, 20g, and 20b would use the same basic type of device. As noted above, this provides the inherent advantages of identical light cones for each color. However, it might be preferred to employ different types of light source devices, in a hybrid arrangement, within the same illumination system 14. As just one example, a laser could be used as part of light source 20r, 20g, or 20b, with LEDs or other sources used for other colors. The selection of a suitable device for light source 20r, 20g, or 20b would be based on factors such as the response characteristics of photosensitive medium 32, device availability and cost, or printing speed requirements, for example.

Figure 4:
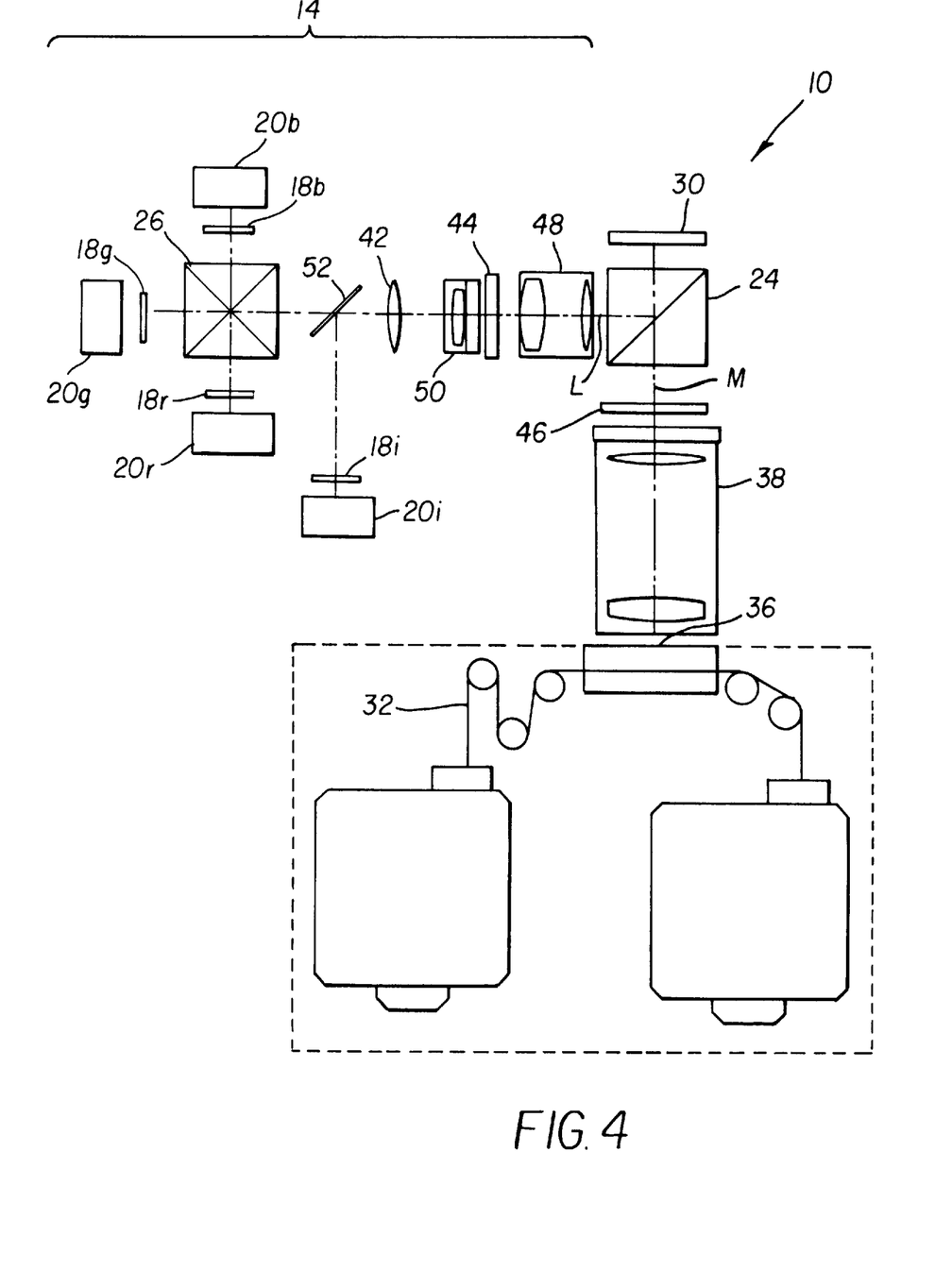
FIG. 4 is a schematic block diagram showing major optical components of a digital printing apparatus in a alternate embodiment of the present invention, using a fourth light source.

For most conventional film printing applications, visible light is used for exposure. However, the present invention does not restrict light sources 20 to the visible spectrum. One or more light sources 20 could provide radiant energy from infrared or ultraviolet regions, for example. Referring to FIG. 4, an alternate embodiment is shown, in which printing apparatus 10 alternately provides invisible light from optional light source 20i. From the view of FIG. 4, infrared or ultraviolet light from light source 20i, conditioned by optional polarization filter 18i, is reflected into the illumination path by dichroic mirror 52. Using the alternate embodiment of FIG. 4, fourth light source 20i could be used for imaging onto the same photosensitive medium 32 that accepts red, green, and blue light. Alternately, fourth light source 20i could be used independently from other light sources 20r, 20g, 20b with one or more different types of photosensitive media 32. As just one example, light source 20i providing infrared light might be the best illumination source for exposing some types of black and white or other monochromatic film media. Using sensor 12 and related control logic as described earlier with reference to FIG. 3, printing apparatus 10 could detect a type of photosensitive medium 32 requiring a separate light source instead of, or in addition to, conventional RGB light.

Photosensitive Medium 32

In the preferred embodiment, printing apparatus 10 is particularly suited to high-speed motion picture film imaging applications. Photosensitive medium 32 could be an intermediate negative film for motion picture production, such as Eastman EXR Color Intermediate Film EK 5244, manufactured by Eastman Kodak Company, Rochester, N.Y. Alternately, photosensitive medium 32 could be a print film, such as KODAK VISION Premier Color Print Film/2393, also manufactured by Eastman Kodak Company, Rochester, N.Y.

However, the present invention is applicable to a broader range of imaging apparatus. Photosensitive medium 32 can be more broadly interpreted to include any of a number of types of sensitized film, paper, or other surface having photosensitive emulsions that respond to image-bearing light. Photosensitive medium 32 could be, for example, a reversal film medium that is positive-acting, so that increasing levels of exposure cause decreasing film densities. Examples of reversal film media include conventional slide film, such as Kodachrome and Ektachrome slide films manufactured by Eastman Kodak Company, Rochester, N.Y. Photosensitive medium 32 can also include an intermediate surface used for forming a color image such as, for example, an electrophotographic imaging medium. Photosensitive medium 32 could alternately comprise an electronic photosensor array or grid employed as a component in an imaging path. Photosensitive medium 32 could also be a dry process media type.

As was described with reference to FIG. 3, printing apparatus 10 of the present invention could be configured to be adaptable to more than one type of photosensitive medium 32. Depending on the photosensitive medium 32 type, a number of adjustments could be made to components of printing apparatus 10 for providing optimal exposure conditions, such as the following:

(a) different light sources 20 could be switched into the optical path;
(b) a different number of LEDs in an LED array used as light source 20 could be energized in order to provide the necessary exposure energy;
(c) adjustment of the drive current for LED or other light source 20;
(d) adjustment of on-time for light source 20, such as using a variable pulse-width scheme; or
(e) addition of a filter or shutter component for attenuating light from any light source 20.

Different calibration Look-Up-Tables (LUTs) could be used for controlling aspects of illumination system 14 operation, based on the type of photosensitive medium 32 that has been loaded.

Mechanical Alignment

In contrast to any illumination scheme using dichroic mirrors that requires alignment of each individual dichroic surface in order to maintain a single illumination axis, the method of the present invention takes advantage of geometric symmetries of dichroic prism 26 or Philips prism 126 for alignment. Moreover, because light sources 20r, 20g, and 20b can be situated near the surfaces of dichroic prism 26 as shown in FIG. 1, or near the surfaces of Philips prism 126 as shown in FIG. 2, spacing requirements and tolerance problems are minimized.

Alternate Embodiments

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, while the preferred embodiment is optimized for providing source illumination to a reflective LCD spatial light modulator 30, the present invention admits a number of alternate embodiments. As is noted above, substituting a polarizer for polarizing beamsplitter 24 would allow use of a transmissive LCD spatial light modulator 30. Alternately, angular redirection of incident light beam L and elimination of polarizing beamsplitter 24 or other polarizing components would allow use of illumination system 14 with a DMD as spatial light modulator 30.

While the preferred embodiment uses visible light from red, green, and blue light sources, light having any suitable wavelength, including light outside the visible spectrum, can be used for any of light sources 20 in illumination source 14. While the description of the embodiment of FIG. 4 would generally be best suited for exposure light outside the visible spectrum, optional light source 20i could be visible light at some alternate wavelength that is particularly suited to a class of photosensitive media 32.

Thus, what is provided is an apparatus for writing color images from digital data onto a photosensitive medium with a plurality of light sources and a single spatial light modulator, light sources directed toward the spatial light modulator through a dichroic prism.

PARTS LIST

10. Printing apparatus
12. Sensor
14. Illumination system
16. Indicator
18. Polarization filter
18r. Polarization filter for red
18g. Polarization filter for green
18b. Polarization filter for blue
18i. Polarization filter for fourth color illumination
20. Light source
20r. Red light source
20g. Green light source
20b. Blue light source
20i. Fourth light source
24. Polarizing beamsplitter 26. Dichroic prism
28. Control logic processor
30. Spatial light modulator
32. Photosensitive medium
36. Image plane
38. Print lens
42. Condensing lens
44. Uniformizer
46. Analyzer
48. Condenser lens
50. Field lens
52. Dichroic mirror
126. Philips prism

What is claimed is:

1. A writing apparatus for forming an image from digital data onto a photosensitive medium comprising:
    (a) a spatial light modulator comprising an array of pixel sites, each pixel site modulating an incident light beam in order to form an array of image pixels according to said digital data;
    (b) an illumination system comprising a dichroic prism for combining input light from a plurality of light sources onto a common output axis to provide said incident light beam;
    wherein said plurality of light sources comprises an LED array; and
    wherein said LED array has substantially the same height-width aspect ratio as said spatial light modulator.

2. The writing apparatus of claim 1 wherein said photosensitive medium is a negative film.

3. The writing apparatus of claim 1 wherein said photosensitive medium is a print film.

4. The writing apparatus of claim 1 wherein said photosensitive medium is a reversal film.

5. The writing apparatus of claim 1 wherein said photosensitive medium is an electrophotographic medium.

6. The writing apparatus of claim 1 wherein said photosensitive medium is an electronic photosensor.

7. The writing apparatus of claim 1 wherein said photosensitive medium is a dry process medium.

8. The writing apparatus of claim 1 wherein said spatial light modulator is a transmissive liquid crystal device.

9. The writing apparatus of claim 1 wherein said spatial light modulator is a reflective liquid crystal device.

10. The writing apparatus of claim 1 wherein said spatial light modulator is a digital micromirror device.

11. The writing apparatus of claim 1 wherein said spatial light modulator is a gated light valve.

12. The writing apparatus of claim 1 wherein said dichroic prism is an X-cube.

13. The writing apparatus of claim 1 wherein said dichroic prism is a Philips prism.

14. The writing apparatus of claim 1 wherein said illumination system further comprises a filter.

15. The writing apparatus of claim 1 wherein said illumination system further comprises a polarizing component.

16. The writing apparatus of claim 1 wherein said illumination system further comprises a shutter.

17. The writing apparatus of claim 1 wherein said illumination system further comprises an optical tunnel.

18. The writing apparatus of claim 1 further comprising a sensor for sensing information encoded on an indicator coupled to said photosensitive medium.

19. The writing apparatus of claim 18 wherein said sensor is an RF sensor.

20. The writing apparatus of claim 18 wherein said sensor is an optical sensor.

21. A The writing apparatus of claim 18 wherein said sensor is an electromagnetic sensor.

22. The writing apparatus of claim 18 wherein said sensor is an electromechanical sensor.

23. The writing apparatus of claim 18 wherein said indicator contains an encoded network address.

24. The writing apparatus of claim 18 wherein said illumination system conditions said incident light beam according to said information encoded on said indicator.

25. The writing apparatus of claim 18 wherein said information comprises an instruction for execution by a control logic processor.

26. The writing apparatus of claim 1 further comprising an auxiliary light source directed into said common output axis by a dichroic surface.

27. The writing apparatus of claim 26 wherein said auxiliary light source is an infrared light source.

28. The writing apparatus of claim 26 wherein said auxiliary light source is an ultraviolet light source.

29. The writing apparatus of claim 1 further comprising a polarizing beamsplitter for conditioning the polarization of said incident light beam.

30. The writing apparatus of claim 1 wherein each of said plurality of light sources is illuminated sequentially.

31. A writing apparatus for forming an image from digital data onto a photosensitive medium comprising:
    (a) a spatial light modulator comprising an array of pixel sites, each pixel site modulating an incident light beam in order to form an array of image pixels according to said digital data;
    (b) an illumination system comprising a dichroic prism for combining input light from a plurality of light sources onto a common output axis to provide said incident light beam;
    wherein said plurality of light sources comprises an LED array; and
    wherein said LED array is substantially flat.

32. A writing apparatus for forming an image from digital data onto a photosensitive medium comprising:
    (a) a spatial light modulator comprising an array of pixel sites, each pixel site modulating an incident light beam in order to form an array of image pixels according to said digital data;
    (b) an illumination system comprising a dichroic prism for combining input light from a plurality of light sources onto a common output axis to provide said incident light beam;
    wherein said illumination system further comprises an integrating bar; and
    wherein said integrating bar has substantially the same height-width aspect ratio as said spatial light modulator.

33. A writing apparatus for forming an image from digital data onto a photosensitive medium comprising:
    (a) a spatial light modulator comprising an array of pixel sites, each pixel site modulating an incident light beam in order to form an array of image pixels according to said digital data;
    (b) an illumination system comprising a dichroic prism for combining input light from a plurality of light sources onto a common output axis to provide said incident light beam;
    wherein said illumination system further comprises a lenslet array; and
    wherein each lens of said lenslet array has substantially the same height-width aspect ratio as said spatial light modulator.

* * * * *